United States Patent
Pederson

(10) Patent No.: US 7,263,536 B1
(45) Date of Patent: Aug. 28, 2007

(54) SYSTEM AND METHOD FOR UPDATING AN INDEX IN A DATABASE

(75) Inventor: Donald R. Pederson, San Diego, CA (US)

(73) Assignee: NCR Corp., Dayton, OH (US)

( * ) Notice: Subject to any disclaimer, the term of this patent is extended or adjusted under 35 U.S.C. 154(b) by 651 days.

(21) Appl. No.: 10/252,264

(22) Filed: Sep. 23, 2002

(51) Int. Cl.
*G06F 17/30* (2006.01)

(52) U.S. Cl. .................................... 707/203

(58) Field of Classification Search ............ 707/1, 707/2, 10, 101, 102, 201, 203
See application file for complete search history.

(56) References Cited

U.S. PATENT DOCUMENTS

| | | | |
|---|---|---|---|
| 5,951,658 A * | 9/1999 | Daray et al. ................. | 710/56 |
| 6,438,562 B1 * | 8/2002 | Gupta et al. ................. | 707/201 |
| 6,457,014 B1 * | 9/2002 | Parker .......................... | 707/102 |
| 6,470,347 B1 * | 10/2002 | Gillam ......................... | 707/101 |
| 2003/0225798 A1 * | 12/2003 | Norcott ........................ | 707/203 |

* cited by examiner

*Primary Examiner*—Etienne LeRoux
(74) *Attorney, Agent, or Firm*—John D. Cowart; Howard Speight; Harden E. Stevens, III

(57) ABSTRACT

A method for updating an index in a database includes storing a plurality of changes to be made to a database index in a change table. Each of the changes is associated with an identifier. The method also includes sorting the changes in the change table based on the identifier associated with each of the changes. The method further includes updating the database index using the sorted changes. The database index includes a data block, and updating the database index includes applying at least two of the changes from the change table to the data block during a single operation.

27 Claims, 4 Drawing Sheets

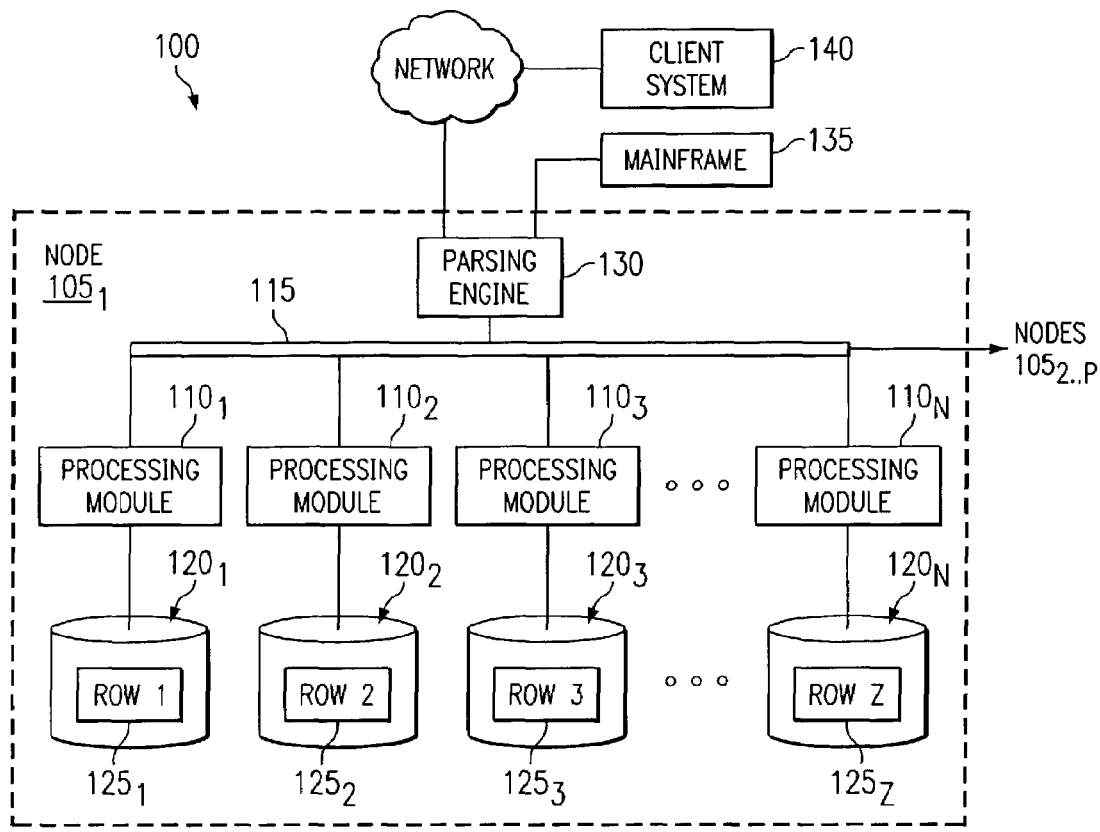
*FIG. 1*
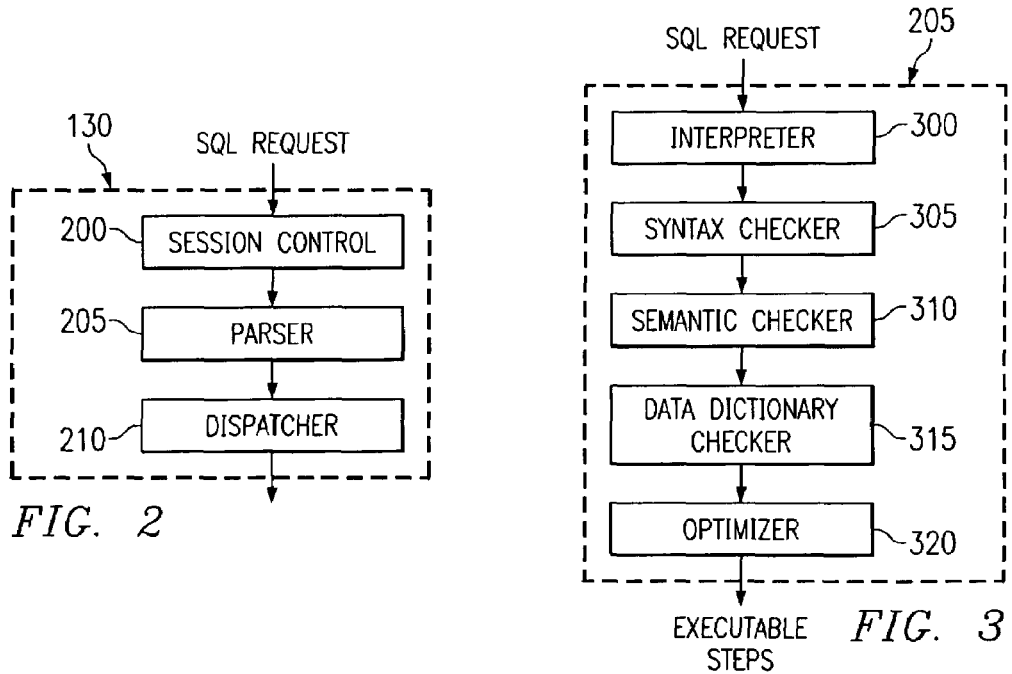
*FIG. 2*
*FIG. 3*

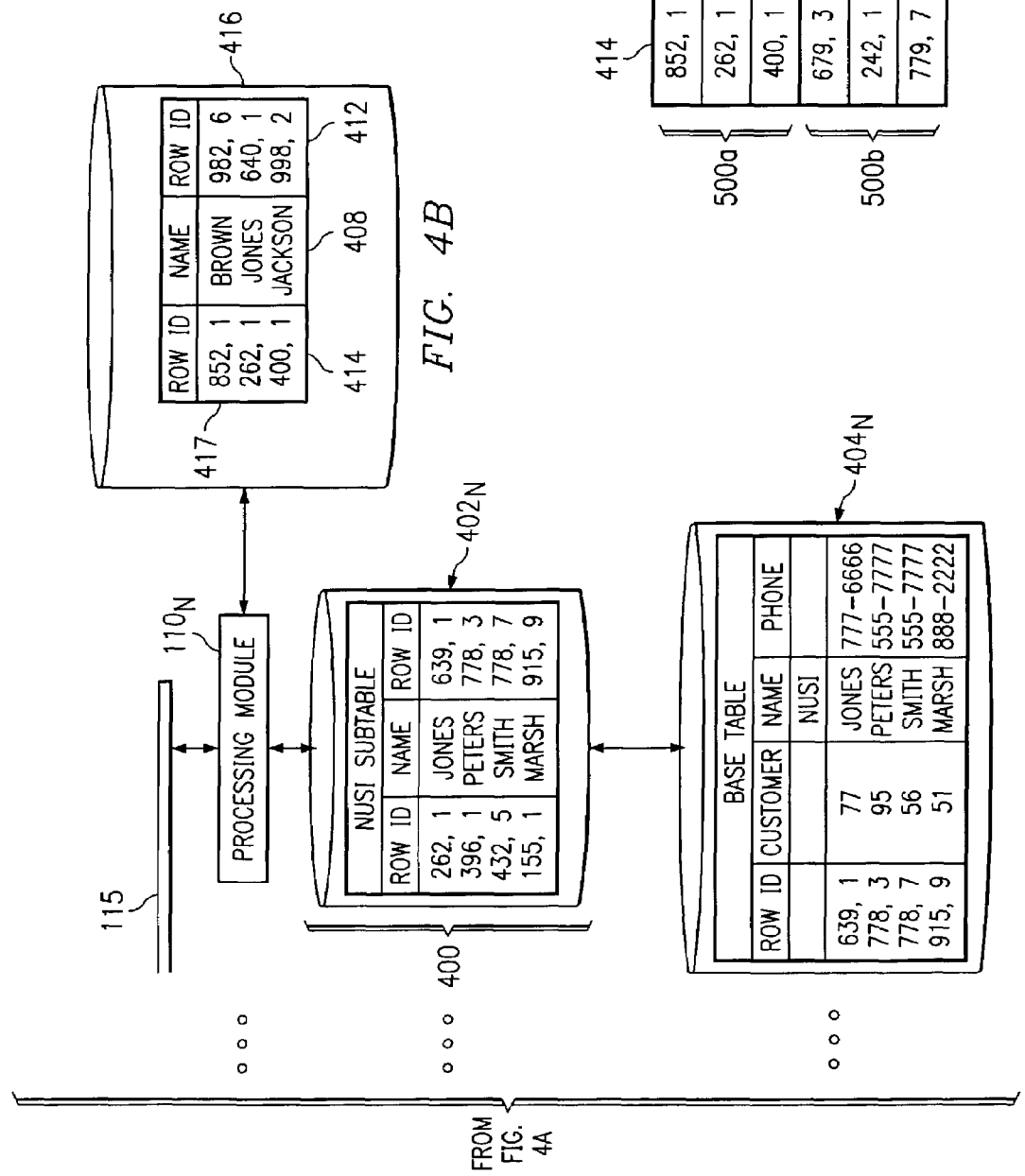

SYSTEM AND METHOD FOR UPDATING AN INDEX IN A DATABASE

BACKGROUND

Data organization is typically important in relational database systems that deal with complex queries and other commands involving large volumes of data. For example, a relational database system often includes one or more indexes to help speed the location of particular information in the system. As a particular example, a relational database system may store information about employees of a corporation, and an index may identify each employee by name and the location of the employee's records in the database system. While the use of an index may speed some database operations, maintenance of the index imposes overhead on the database system. As an example, the index typically must be updated each time a new employee is added or removed from the database system.

SUMMARY

This disclosure provides an improved system and method for updating an index in a database that reduce or eliminate at least some of the shortcomings associated with prior approaches.

In one aspect, a method for updating an index in a database includes storing a plurality of changes to be made to a database index in a change table. Each of the changes is associated with an identifier. The method also includes sorting the changes in the change table based on the identifier associated with each of the changes. The method further includes updating the database index using the sorted changes. The database index includes a data block, and updating the database index includes applying at least two of the changes from the change table to the data block during a single operation.

In another aspect, a system for updating an index in a database includes a memory and one or more processors. The memory is operable to store a plurality of changes to be made to a database index in a change table. Each of the changes is associated with an identifier. The one or more processors are collectively operable to sort the changes in the change table based on the identifier associated with each of the changes and update the database index using the sorted changes. The database index includes a data block, and updating the database index includes applying at least two of the changes from the change table to the data block during a single operation.

One or more technical advantages may be provided according to various embodiments of this disclosure. Particular embodiments of this disclosure may exhibit none, some, or all of the following advantages depending on the implementation. For example, a system for updating an index in a database may be provided. In particular, entries in the database can be inserted, deleted, or modified, and the system can update the index to reflect those changes using fewer operations. Since the index can be updated in fewer operations, this may help to reduce the amount of time needed to perform operations involving the database. Also, because less time is needed to perform the database operations, this may help to increase the operational speed of the database system.

Other technical advantages will be readily apparent to one skilled in the art from the following figures, descriptions, and claims.

BRIEF DESCRIPTION OF THE DRAWINGS

FIG. 1 is a block diagram of a node of a database system;
FIG. 2 is a block diagram of a parsing engine;
FIG. 3 is a flowchart of a parser;
FIG. 5 is a block diagram of a work table used to update a database index.

DETAILED DESCRIPTION

Figure 4A:
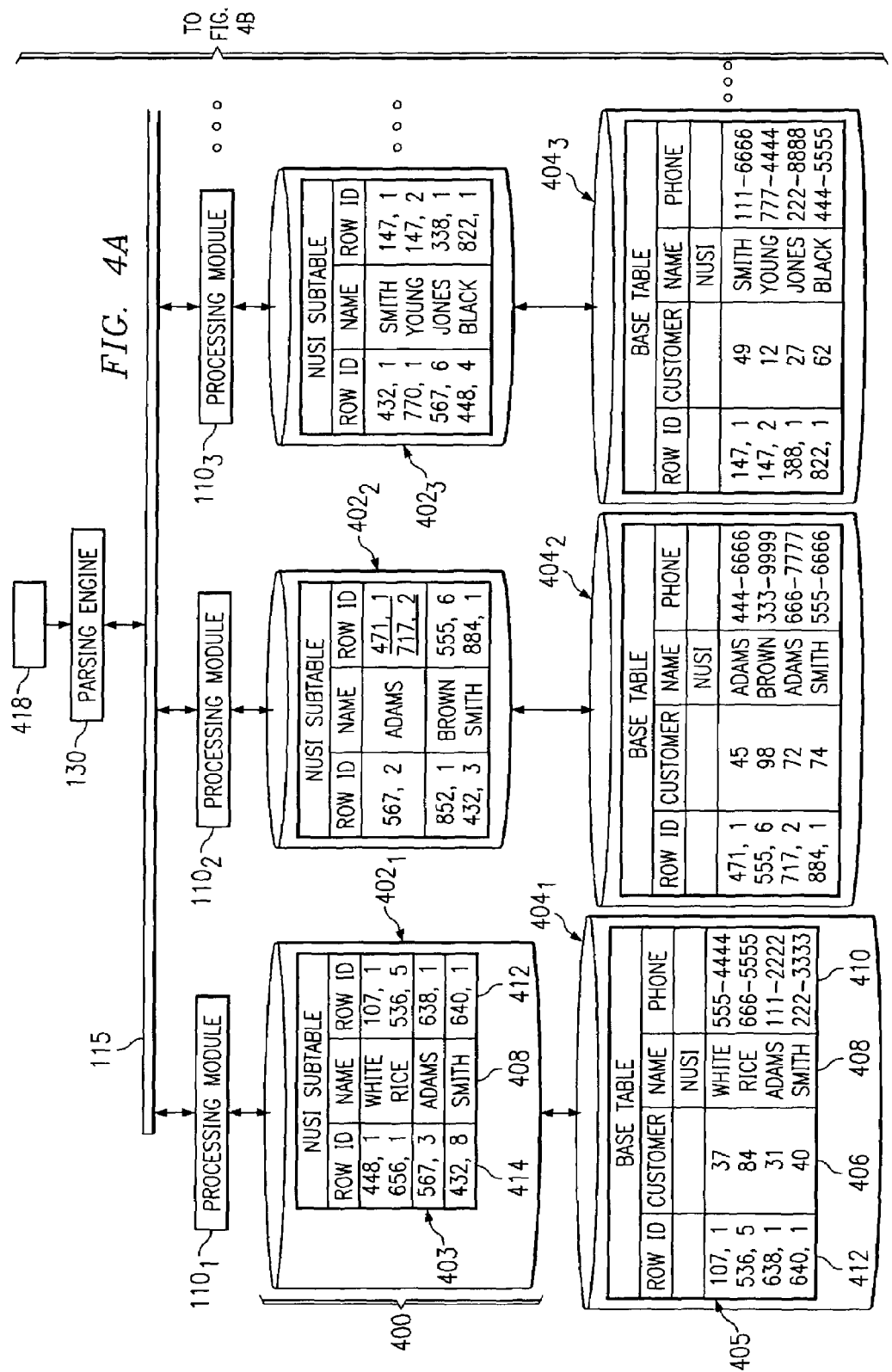
FIG. 4 is a block diagram of a database index.

The index update technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

In an example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

An index 400, illustrated in FIG. 4, may be used by processing modules 110 to locate and access information in a database table stored in one or more data-storage facilities 120. In the illustrated example, index 400 is divided into multiple subtables $402_{1...N}$, and the database table is divided into multiple base tables $404_{1...N}$. In this example, each base table 404 is associated with one of the index subtables 402. In this specification, the term "each" refers to each of at least a subset of the identified items.

In FIG. 4, base tables 404 store information associated with customers of an organization. In this example, each row 405 in base tables 404 includes a customer number 406, a customer name 408, and a customer phone number 410. Each row 405 is also uniquely identified by a row identifier 412. In an example system, row identifier 412 represents a hash value/partition value and a uniqueness value. In a particular system, row identifier 412 is located in the row header of a row 405. Base tables 404 could store any other or additional information about the customers, or base tables 404 could store different types of information.

Index 400 provides a mechanism for locating and accessing information in base tables 404. In the illustrated example, each row 403 in index 400 includes a field from rows 405 used as a key to index rows 405 and one or more row identifiers 412 from a base table 404. In this specification, the phrase "key field" refers to a field in a row 405 that is used to index a base table 405. Each row 403 is also uniquely identified by a row identifier 414. In this example, index 400 represents a non-unique secondary index (NUSI), which uses the customer names 408 as the key to index the information base tables 404. Index 400 is also divided into subtables 402. Other types of divided or undivided indexes, such as a covered index, could also be used. In a particular system, row identifier 414 is located in the row header of a row 403.

In an example system, the information in base tables 404 may be changed. For example, parsing engine 130 may receive a request 418 or other command from mainframe 135 or client computer 140 to add, delete, or modify one or multiple rows in base tables 404. Parsing engine 130 communicates with one or more processing modules 110, and processing modules 110 alter the information in base tables 404 as requested. Because these operations alter the information in base tables 404, one or more of the index subtables 402 may need to be updated. As an example, when a row 405 is added to a base table 404, a row 403 in index 400 is usually added or modified to identify the new row 405. When a row 405 is deleted from a base table 404, a row 403 in index 400 is usually deleted or modified to remove the reference to the deleted row 405.

To update the index 400, one or more work tables 416 may be generated. In a particular system, each processing module 110 may generate and have access to a work table 416. Each work table 416 may include one or more rows 417 that identify changes to be made to index 400 as a result of a request 418 being executed. As an example, when a change is made to a row 405 in a base table 404, a processing module 110 may insert a row 417 into work table 416. As described below, the change might include the addition of a new row 405, the deletion of an existing row 405, or a modification to an existing row 405 in base tables 404. After the actions requested by request 418 are completed, the rows 417 in work table 416 can be used to update index 400.

A row 417 may be inserted into a work table 416 when a row 405 is added to or removed from a base table 404. In the illustrated example, when a row 405 is added to a base table 404, a processing module 110 may insert a row 417 in work table 416. The new row 417 includes the field by which the base tables 404 are indexed (customer name 408 in this example) and the row identifier 412 of the new row 405. If the field used to index the new row 405 has a value that is not already contained in the index subtable 402, processing module 110 may also generate a new row identifier 414 and insert it into row 417. If the field used to index the new row 405 (customer name 408) has a value that is already contained in a row 403 in the index subtable 402, processing module 110 may identify the row identifier 414 associated with that row 403 and insert it into row 417. When a row 405 is deleted from base tables 404, the customer name 408, row identifier 412 associated with the deleted row 405, and the row identifier 414 associated with a row 403 are inserted into row 417.

A row 417 may or may not be inserted into work table 416 when a row 405 in a base table 404 is modified. In the illustrated example, index 400 uses the customer names 408 as the key to index base tables 404, and rows 417 are generated when the value of a key field changes in a row 405. For example, if the phone number 410 in an existing row 405 is changed, index 400 may not need to be updated. However, if the customer name 408 in a row 405 changes, index 400 may need to be updated. In a particular system, a work table 416 contains rows 417 that add rows 403 to index 400 or that remove rows 403 from index 400. If some rows 403 need to be added and others removed, two work tables 416 are used. In this system, when the customer name 408 in a row 405 changes, a processing module 110 may insert a row 417 into one work table 416 that deletes an existing row 403 associated with the old name 408. The processing module 110 may also insert another row 417 into another work table 416 that adds a new row 403 associated with the new name 408.

When the actions requested by request 418 are completed, the rows 417 in work table 416 are used to update index 400. For example, the rows 417 may be sorted by row identifier 414. After the rows 417 are sorted, the contents of rows 417 may be written to index 400. In a particular system, processing module 110 uses a merge insert or a merge delete to update its index subtable 402 using the contents of a work table 416.

In an example system, index subtables 402 may each be formed from one or more data blocks, and each data block could contain any number of rows 403. In a particular system, when a work table 416 is used to update index 400, the rows 417 in work table 416 are applied one block at a time to the index subtables 402. In other words, each data block is read from and/or written to once (if at all), no matter how many rows 403 are being added, modified, or deleted. As a particular example, one hundred rows may be added to base tables 404, but the rows 405 might be inserted into only two base tables $404_3$ and $404_N$. The index subtables $402_3$ and $402_N$ associated with those base tables $404_3$ and $404_N$ may each include a single data block. In this example, index subtables $402_3$ and $402_N$ could be updated in as little as two operations, one for each data block forming subtables $402_3$ and $402_N$. As a result, fewer operations may be needed to update the index 400, and index 400 can be updated more quickly. Once an index subtable 402 is updated, the processing module 110 may release the work table 416.

In a particular system, a row 405 in one base table 404 may be associated with a backup or fallback row 405 in another base table 404. For example, the rows 405 in base table $404_1$ may be recreated in base table $404_N$, which may represent a backup copy of base table $404_1$. In this example, when a change is made to a row 405 in a base table 404, the same change is typically made to the fallback row 405 in another base table 404. As a result, multiple index subtables 402 may need to be updated, one for the primary base table 404 and one for the fallback base table 404. When a request 418 has been completed, a processing module 110 may scan work table 416 and identify any rows 417 associated with fallback rows 405. If processing module 110 locates any rows 417, processing module 110 communicates the rows 417 to the processing module or modules 110 serving the fallback rows 405. The processing module 110 serving the fallback rows 405 could then updated its index subtable 402 using the received rows 417.

When the contents of a work table 416 are being applied to index 400, processing module 110 could use the row identifiers 414 in work table 416 to speed the process. For example, processing module 110 may be inserting the changes from work table 416 into index 400. During this update, processing module 110 could determine if the hash value/partition value in a row identifier 414 of a row 417 exceeds the largest hash value/partition value in the row identifiers 414 of rows 403. If so, processing module 110 could simply copy the remaining rows 417 in work table 416 into index 400. In this case, rows 417 with smaller values in their row identifier 414 might be combined with an existing row 403 in index subtable 402. As an example, in FIG. 4, the second row 417 of work table 416 may be combined with the first row 403 of index subtable $402_N$ because both share a common row identifier 414. In contrast, rows 417 with larger values may represent new rows 403 to be created in index subtable 402, and processing module 110 may not need to check whether rows 403 in subtable 402 have the same row identifiers 414.

In certain systems, the ability to update index subtables 402 in this manner may be limited. For example, this index update technique could be limited to requests 418 that involve more than one row being changed per processing module 110 (without fallback base tables 404 involved) or more than two rows being changed per processing module 110 (with fallback base tables 404 involved). As another example, for performance reasons, this index update technique could also be limited to requests 418 involving an all-row scan or a merge involving an entire table, which may prevent requests 418 affecting only a few rows from using this technique. Other, additional, or no limitations could also be used in DBS 100.

In a particular system, each work table 416 represents a primary partitioned index (PPI) table. In a PPI table, rows in the table are logically ordered according to a row identifier (such as row identifier 414). The row identifier includes a first value that is based on one or more columns of the table. The row identifier also includes a second value that is based on one or more columns of the table, which may be different from or the same as those on which the first value is based. The first value of the row identifier is predominate in determining the order of the rows in the data-storage facilities 120. The second value determines the order of those rows with identical first values. In a more specific implementation, the row identifier may also includes a third value, and the third value determines the order of rows with identical first and second values.

Although FIG. 4 illustrates one example of a database index 400, various changes may be made to index 400. For example, the contents of index subtables 402, base tables 404, and work table 416 are for illustration only. Also, while the work table 416 shown in FIG. 4 is used by processing module $110_N$, other processing modules 110 may have access to a similar table. Further, each processing module 110 could use multiple work tables 416. As a particular example, base tables 404 could be associated with multiple indexes 400, such as NUSI and covered indexes. In this example, processing module 110 could use at least one separate work table 416 for each type of index 400 supported by that processing module 110.

As illustrated in FIG. 5, a work table 416 could include multiple partitions 500a-500b. Partitions 500 may be useful, for example, when multiple fields in rows 405 are used by multiple indexes 400. For example, index 400 is illustrated in FIG. 4 as using customer names 408 as an index into base tables 404. Another index 400 could use customer phone numbers 410 as an index into base tables 404. When multiple fields in rows 405 are used to index base tables 404, a change to one row 405 could affect multiple indexes 400. For example, adding a row in a base table 404 may lead to the addition of a new row 403 in two different indexes 400, one in the index 400 that uses the customer name 408 and one in the index 400 that uses the customer phone number 410.

To allow a processing module 110 to update multiple indexes 400, work table 416 could be divided into partitions 500. Each partition 500 may be associated with a different index 400. As shown in FIG. 5, partition 500a may be associated with the index 400 that uses the customer names 408, and partition 500b may be associated with the index 400 that uses the customer phone numbers 410. In this example system, when a change is made to a row in a base table 404, processing module 110 could insert multiple rows 417 into work table 416, one in each partition 500. When a request 418 is completed, processing module 110 could sort each partition 500 separately. After that, the contents of each partition 500 can be used to update a different index 400.

The ability to use partitions 500 to store changes to multiple indexes 400 may depend, at least in part, on whether the indexes 400 represent different index types. If the indexes 400 are the same type of index, such as two NUSI indexes, a single work table 416 with partitions 500 could be used. If the indexes 400 are different types of indexes, such as a NUSI index and a covered index, multiple work tables 416 may be needed.

During the sort of work table 416, rows 417 associated with a common row 405 in a base table 404 may be merged. As a particular example, two rows 417 might represent the addition of two rows 405 to a base table 404, where both new rows 405 are associated with the same customer. In this case, only a single row 403 needs to be created in index 400.

As a result, the rows 417 could be combined in work table 416, and the consolidated row 417 could represent both of the new rows 405 in base tables 404.

Although FIG. 5 illustrates one example of a partitioned work table, various changes may be made to FIG. 5. For example, work table 416 could include any suitable number of partitions 500. Also, processing module 110 could use separate work tables 416 for each index 400 even when the indexes 400 are of the same index type, and a partitioned work table may not be needed.

Figure 6:
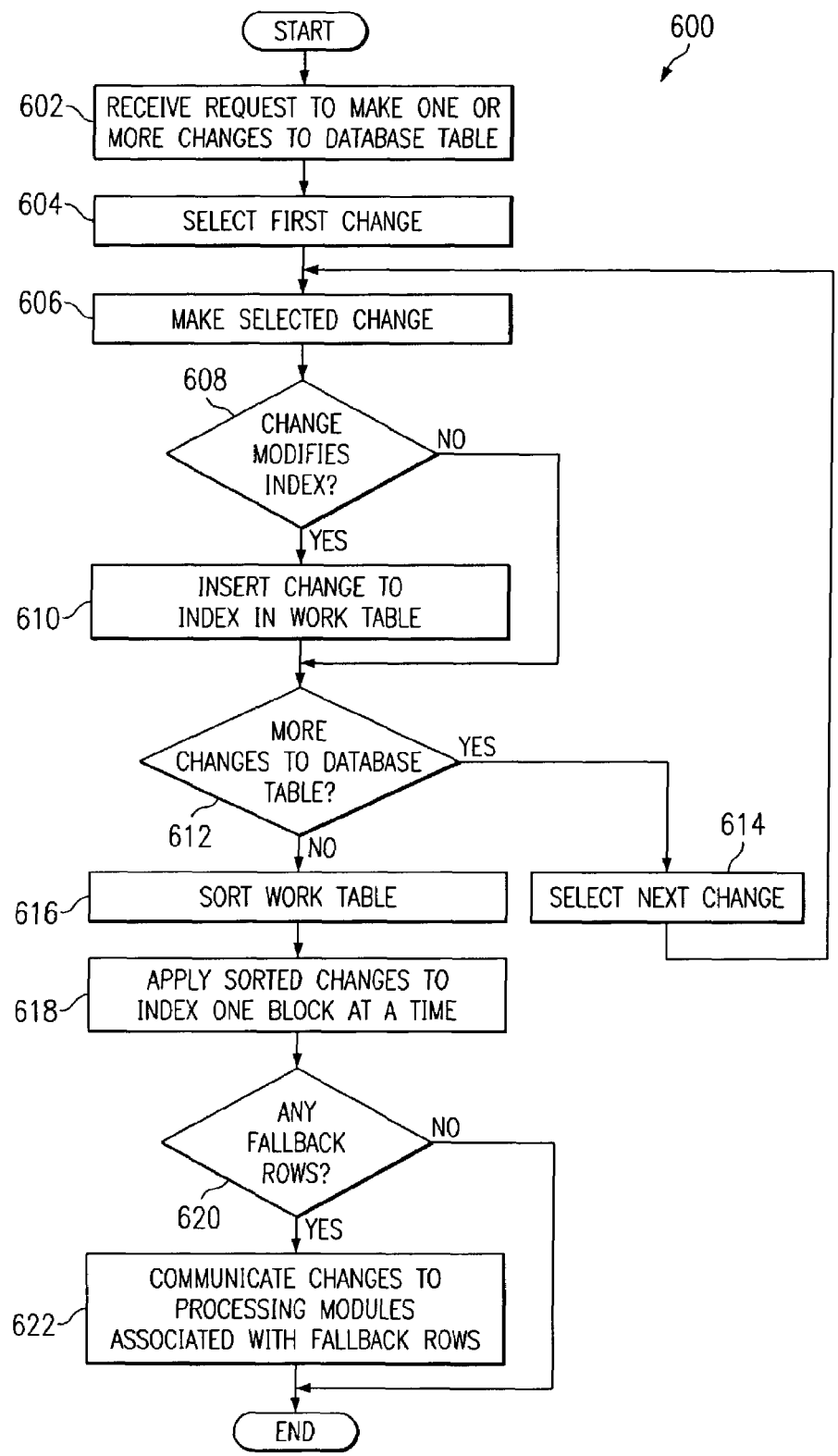
FIG. 6 is a flow diagram of a method for updating a database index.

FIG. 6 is a flow diagram of a method 600 for updating a database index. Method 600 is described with respect to DBS 100 of FIG. 1 using index 400 of FIG. 4. Method 600 could also be used by any other suitable system using any other suitable index or indexes.

Processing module 110 receives a request to make one or more changes to a database table at block 602. This may include, for example, parsing engine 130 receiving a request 418 from mainframe 135 or client computer 140. This may also include parsing engine 130 identifying one or more of the processing modules 110 that have access to the information associated with the request 418. This may further include parsing engine 130 communicating a request to each of the identified processing modules 110.

Processing module 110 selects the first change to be made to the database table at block 604. This may include, for example, processing module 110 identifying the function to be performed. This may also include processing module 110 determining that one or more new rows 405 are being added to base table 404. This may further include processing module 110 identifying one or more rows 405 in base table 404 to be modified or deleted. Processing module 110 implements the selected change at block 606. This may include, for example, processing module 110 adding a new row 405, modifying an existing row 405, or deleting an existing row 405 in base table 404.

Processing module 110 determines if the implemented change requires a modification to the contents of one or more indexes 400 at block 608. In an example system, the addition of a new row 405 or the deletion of a row 405 in a base table 404 modifies the contents of an index 400, and a modification to a row 405 might modify the contents of an index 400. In this example system, if the modification to a row 405 changes the value of a field used as the key in an index 400, the modification to row 405 modifies index 400.

If the implemented change requires a modification to at least one index 400, processing module 110 inserts the change to be made to index 400 into a work table 416 at block 610. This may include, for example, processing module 110 inserting one row 417 into a work table 416, multiple rows 417 into different partitions 500 in a work table 416, or multiple rows 417 into different work tables 416.

Processing module 110 determines whether additional changes remain to be made to the database table at block 612. If so, processing module 110 selects the next change to be made at block 614. Processing module 110 then returns to block 606 to implement the change and update the work table or tables 416 if needed.

If no more changes need to be implemented, processing module 110 sorts the work table 416 at block 616. This may include, for example, processing module 110 sorting one or multiple work tables 416 by row identifier 414. This may also include processing module 110 sorting each partition 500 in a work table 416.

Processing module 110 applies the sorted changes to one or more indexes 400 at block 618. This may include, for example, processing module 110 applying the sorted changes to an index 400 one data block at a time. In this way, each data block in an index 400 is read from and/or written to once, no matter how many rows 403 are being added, modified, or deleted in that data block. This may also include processing module 110 using a merge insert or merge delete to apply the changes from a work table 416 to an index 400.

Processing module 110 determines if there are any fallback rows associated with changed rows 405 at block 620. This may include, for example, processing module 110 determining if any of the rows 405 in base table 404 that were changed at block 606 have fallback rows in another base table 404. This may also include processing module 110 determining if any of the changes made to those rows 405 modified one or more indexes 400. If so, processing module 110 communicates the changes to one or more other processing modules 110 associated with the fallback rows at block 622. This may include, for example, processing module 110 communicating with other processing modules 110 over network 115. This may also include the processing module 110 communicating at least a portion of the contents of work table 416 to the other processing modules 110 and allowing those processing modules 110 to update their index subtables 402 one data block at a time.

Although FIG. 6 illustrates one example of a method 600 for updating a database index, various changes may be made to method 600. For example, processing module 110 could determine that a particular change alters a row 405 associated with a fallback row and set a flag, and processing module 110 could then identify the status of the flag at block 620. Also, processing module 110 could receive multiple requests at block 602, where each request is associated with a single change to the base table 404. In this example, processing module 110 would not need to select changes at blocks 604 and 614. Further, DBS 100 might not allow the use of fallback rows 405, and processing module 110 would not need to support the updating of additional index subtables 402.

The text above described one or more specific embodiments of a broader invention. The invention also is carried out in a variety of alternative embodiments and thus is not limited to those described here. For example, while the invention has been described here in terms of a DBMS that uses a massively parallel processing ("MPP") architecture, other types of database systems, including those that use a symmetric multiprocessing ("SMP") architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for updating an index in a database, comprising:

storing a plurality of changes to be made to a database index in a work table, each of the changes associated with an identifier;

sorting the changes in the work table based on the identifier associated with each of the changes; and updating the database index using the sorted changes, the database index comprising a data block, wherein updating the database index comprises applying at least two of the changes from the work table to the data block during a single operation.

2. The method of claim 1, wherein:
the database index comprises one of a plurality of indexes;
storing the changes to be made to the database index comprises storing each of the changes in one or more partitions of the work table;
sorting the changes in the work table comprises sorting each of the partitions in the work table; and
updating the database index comprises updating each of the indexes using one of the partitions.

3. The method of claim 1, wherein:
the database index comprises one of a plurality of indexes;
the work table comprises one of a plurality of work tables;
storing the changes to be made to the database index comprises storing each of the changes in one of the work tables;
sorting the changes in the work table comprises sorting each of the work tables; and
updating the database index comprises updating each of the indexes using one of the work tables.

4. The method of claim 1, wherein the database index comprises a plurality of index subtables each associated with at least one processor.

5. The method of claim 4, wherein:
at least one of the changes is associated with a row in a database table, the row having an associated fallback row, wherein the at least one change is used to update one of the index subtables; and
the method further comprises communicating the at least one change from a first processor to a second processor for use by the second processor in updating another of the index subtables.

6. The method of claim 1, wherein storing the changes in the work table comprises:
receiving one or more database commands requesting modifications to a database table;
executing the one or more database commands;
determining if the modifications to the database table require modifications to the database index; and
storing the changes in the work table when the modifications to the database table require modifications to the database index.

7. The method of claim 6, wherein determining if the modifications to the database table require modifications to the database index comprises:
determining that modification of the database index is needed when the one or more database commands insert or delete a row in the database table; and
determining that modification of the database index is needed when the one or more database commands change a value of a key field in a row of the database table.

8. The method of claim 1, wherein:
the identifier comprises a first identifier associated with the database index; and
storing one of the changes in the work table comprises inserting a first row into the work table, the first row comprising the first identifier, a second identifier associated with a database table, and at least one key field from a second row in the database table.

9. The method of claim 1, wherein:
storing the changes in the work table comprises inserting a plurality of rows into the work table; and
sorting the changes in the work table comprises merging two of the rows in the work table.

10. The method of claim 1, wherein updating the database index comprises executing one of a merge insert and a merge delete to apply the changes to the database index.

11. The method of claim 1, wherein the database index comprises at least one of a non-unique secondary index and a covered index each associated with a separate work table.

12. The method of claim 1, wherein:
the database index comprises a plurality of data blocks; and
updating the database index comprises applying at least two of the changes from the work table to each of the data blocks.

13. A system for updating an index in a database, comprising:
logic encoded on at least one computer readable medium; and
the logic operable when executed to:
store a plurality of changes to be made to a database index in a work table, each of the changes associated with an identifier;
sort the changes in the work table based on the identifier associated with each of the changes; and
update the database index using the sorted changes, the database index comprising a data block, wherein updating the database index comprises applying at least two of the changes from the work table to the data block during a single operation.

14. The system of claim 13, wherein:
the database index comprises one of a plurality of indexes;
the logic is operable to store the changes to be made to the database index by storing each of the changes in one or more partitions of the work table;
the logic is operable to sort the changes in the work table by sorting each of the partitions in the work table; and
the logic is operable to update the database index by updating each of the indexes using one of the partitions.

15. The system of claim 13, wherein:
the database index comprises one of a plurality of indexes;
the work table comprises one of a plurality of work tables;
the logic is operable to store the changes to be made to the database index by storing each of the changes in one of the work tables;
the logic is operable to sort the changes in the work table by sorting each of the work tables; and
the logic is operable to update the database index by updating each of the indexes using one of the work tables.

16. The system of claim 13, wherein:
the database index comprises a plurality of index subtables;
at least one of the changes is associated with a row in a database table, the row having an associated fallback row, wherein the at least one change is used to update one of the index subtables; and
the logic is further operable to communicate the at least one change for use in updating another of the index subtables.

17. The system of claim 13, wherein the logic is operable to store the changes in the work table by:
receiving one or more database commands requesting modifications to a database table;
executing the one or more database commands;
determining that modification of the database index is needed when the one or more database commands insert or delete a row in the database table; and determining that modification of the database index is needed when the one or more database commands change a value of a key field in a row of the database table; and storing the changes in the work table when the modifications to the database table require modifications to the database index.

18. The system of claim 13, wherein:

the identifier comprises a first identifier associated with the database index; and the logic is operable to store one of the changes in the work table by inserting a first row into the work table, the first row comprising the first identifier, a second identifier associated with a database table, and at least one key field from a second row in the database table.

19. The system of claim 13, wherein:

the database index comprises a plurality of data blocks; and the logic is operable to update the database index comprises by at least two of the changes from the work table to each of the data blocks.

20. A system for updating an index in a database, comprising:

a memory operable to store a plurality of changes to be made to a database index in a work table, each of the changes associated with an identifier; and one or more processors collectively operable to:

sort the changes in the work table based on the identifier associated with each of the changes; and update the database index using the sorted changes, the database index comprising a data block, wherein updating the database index comprises applying at least two of the changes from the work table to the data block during a single operation.

21. The system of claim 20, wherein:

the database index comprises one of a plurality of indexes;

the one or more processors are collectively operable to store the changes to be made to the database index by storing each of the changes in one or more partitions of the work table;

the one or more processors are collectively operable to sort the changes in the work table by sorting each of the partitions in the work table; and the one or more processors are collectively operable to update the database index by updating each of the indexes using one of the partitions.

22. The system of claim 20, wherein:

the database index comprises one of a plurality of indexes;

the work table comprises one of a plurality of work tables;

the one or more processors are collectively operable to store the changes to be made to the database index by storing each of the changes in one of the work tables;

the one or more processors are collectively operable to sort the changes in the work table by sorting each of the work tables; and the one or more processors are collectively operable to update the database index by updating each of the indexes using one of the work tables.

23. The system of claim 20, wherein:

the database index comprises a plurality of index subtables;

at least one of the changes is associated with a row in a database table, the row having an associated fallback row, wherein the at least one change is used to update one of the index subtables; and the one or more processors are further collectively operable to communicate the at least one change for use in updating another of the index subtables.

24. The system of claim 20, wherein the one or more processors are collectively operable to store the changes in the work table by:

receiving one or more database commands requesting modifications to a database table;

executing the one or more database commands;

determining that modification of the database index is needed when the one or more database commands insert or delete a row in the database table; and determining that modification of the database index is needed when the one or more database commands change a value of a key field in a row of the database table; and storing the changes in the work table when the modifications to the database table require modifications to the database index.

25. The system of claim 20, wherein:

the identifier comprises a first identifier associated with the database index; and the one or more processors are collectively operable to store one of the changes in the work table by inserting a first row into the work table, the first row comprising the first identifier, a second identifier associated with a database table, and at least one key field from a second row in the database table.

26. The system of claim 20, wherein:

the database index comprises a plurality of data blocks; and the one or more processors are collectively operable to update the database index comprises by at least two of the changes from the work table to each of the data blocks.

27. A database management system, comprising:

a massively parallel processing system comprising:

one or more nodes;

a plurality of processors, each of the one or more nodes providing access to one or more processors; and a plurality of vial processes, each of the one or more processors providing access to one or more virtual processes;

a set of one or more database tables residing on the one or more nodes, the one or more database tables containing information organized by geographic location; and one or more of the plurality of virtual processes operable to:

store a plurality of changes to be made to a database index in a work table, each of the changes associated with an identifier, the database index associated with at least one of the database tables;

sort the changes in the work table based on the identifier associated with each of the changes; and update the database index using the sorted changes, the database index comprising a data block, wherein updating the database index comprises applying at least two of the changes from the work table to the data block during a single operation.

* * * * *